J. W. STICKLER.
Vegetable Cutter.
No. 26,714.
Patented Jan'y 3, 1860.
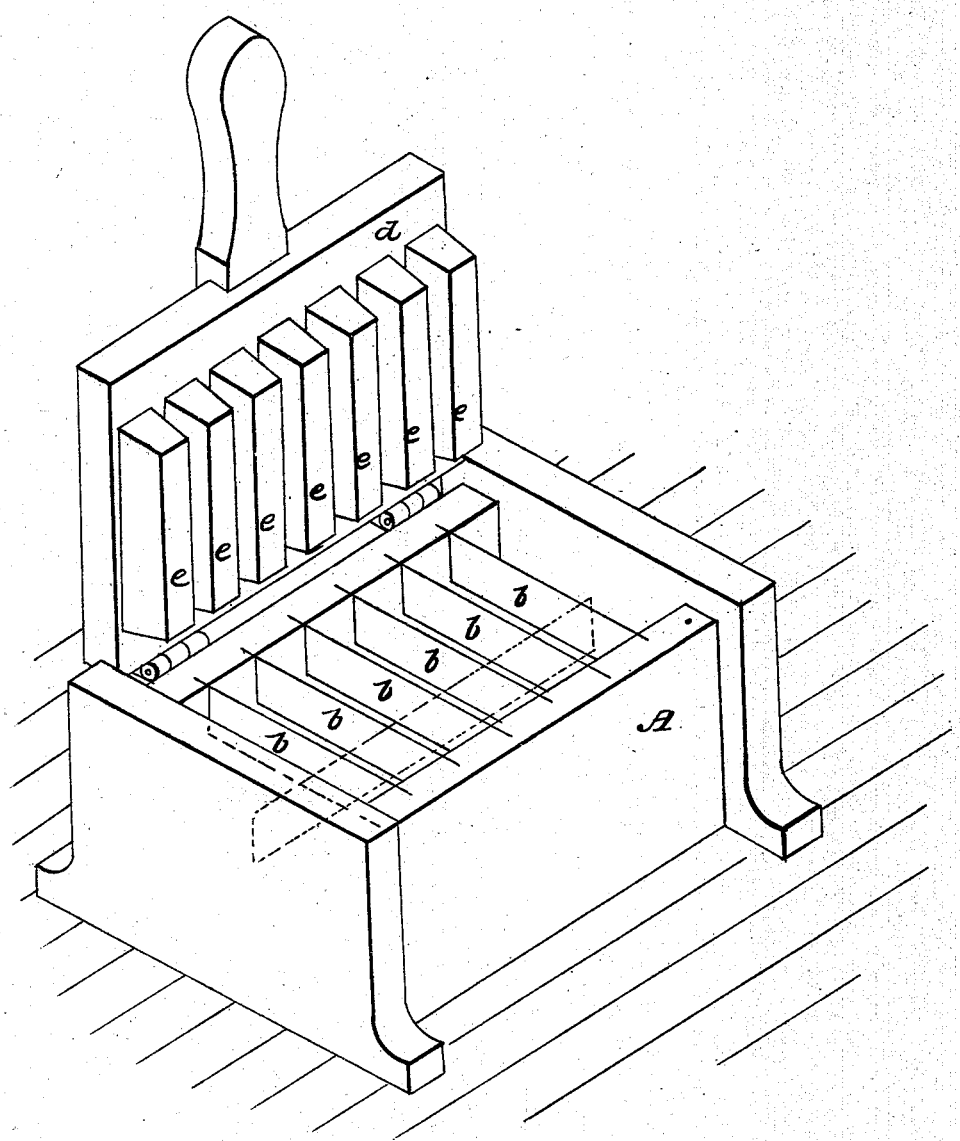

UNITED STATES PATENT OFFICE.

JOSEPH W. STICKLER, OF ORANGE, NEW JERSEY.

VEGETABLE-CUTTER.

Specification of Letters Patent No. 26,714, dated January 3, 1860.

*To all whom it may concern:*

Be it known that I, JOSEPH W. STICKLER, of Orange, in the county of Essex and State of New Jersey, have invented a new and useful Machine for the Cutting of Vegetables for Agricultural Purposes; and I do hereby declare that the following is a full, clear, and exact description of the same, reference being made to the annexed drawing, making a part of this specification.

The vegetable cutters ordinarily employed are too expensive to come into as general use as is desirable, since they are usually constructed to do the amount of work necessary where a large number of cattle are kept. These implements are however quite as useful in the smaller way, and my invention affords a ready method of constructing one which can be made at but little cost, while it does the work actually better than by those hitherto in use, and can be made of any size.

I construct an oblong box of wood or metal as seen in the annexed drawing at A, and across this, at the top, I place a series of thin knives (*b*) at say an inch apart, as shown, and immediately under these I place one or more similar knives lengthwise, as seen at (*c*). A cover (*d*) is hinged upon the side of the box and this has upon its under surface projecting blocks (*e*) which should nearly fill the spaces between the knives (*b*). If now a number of the carrots or other vegetables to be cut are placed upon the knives, and the cover be brought down by means of its handle, the vegetables will be forced down between the knives, being broken as well as cut, by the action of the blocks (*e*). The lower knife (*c*) or knives, effect a further division of the mass and the operation may be continued until the desired quantity has been prepared.

It will be seen that a cheap, simple and efficacious machine can be thus constructed adequate to the requirements of those who keep but few as well as those who keep many cattle being capable of being extended in size to any degree required.

If necessary to avoid clogging, the cover (*d*) may have slots cut through it between the projecting blocks and immediately over the knives.

I claim—

The series of cutting knives in combination with the projecting blocks upon the cover arranged in the manner and for the purposes substantially as described herein.

JOSEPH W. STICKLER.

Witnesses:
J. P. PIRSSON,
S. H. MAYNARD.